(12) United States Patent
Sung et al.

(10) Patent No.: US 7,528,926 B2
(45) Date of Patent: May 5, 2009

(54) PRINTING BEAD SPACERS ON LCD SUBSTRATES

(75) Inventors: Byoung-Hun Sung, Seoul (KR);
Bong-Sung Seo, Yongin-si (KR);
Baek-Kyun Jeon, Yongin-si (KR);
Jeong-Uk Heo, Seongnam-si (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 324 days.

(21) Appl. No.: 11/485,029

(22) Filed: Jul. 11, 2006

(65) Prior Publication Data

US 2007/0009192 A1     Jan. 11, 2007

(30) Foreign Application Priority Data

Jul. 11, 2005    (KR) .................. 10-2005-0062264

(51) Int. Cl.
    *G02F 1/13*    (2006.01)
(52) U.S. Cl. ....................................... 349/187; 349/191
(58) Field of Classification Search ......... 349/155–157, 349/187–192; 156/60, 277
    See application file for complete search history.

(56) References Cited

U.S. PATENT DOCUMENTS

| 4,924,243 A | 5/1990 | Sato et al. |
| 2004/0112858 A1 | 6/2004 | Yang |

FOREIGN PATENT DOCUMENTS

| JP | 8-332718 | 12/1996 |
| JP | 9-29948 | 2/1997 |
| JP | 9-141835 | 6/1997 |
| JP | 10-296957 | 11/1998 |
| JP | 2001-249342 | 9/2001 |
| JP | 2005-59415 | 3/2005 |
| KR | 1999-010129 | 2/1999 |
| KR | 2002-0088459 | 11/2002 |

(Continued)

OTHER PUBLICATIONS

Patent Abstracts of Japan, Publication No. 08-332718, Dec. 17, 1996, 1 p.

(Continued)

*Primary Examiner*—Kevin S Wood
(74) *Attorney, Agent, or Firm*—MacPherson Kwok Chen & Held LLP; Mark A. Pellegrini

(57) ABSTRACT

An apparatus for printing spacers on a substrate of an LCD includes a spacer supply roller having a plurality of recesses formed in its exterior surface. A plurality of uniform volumes of an ink containing the spacers is loaded into the recesses and then transferred from the supply roller onto a transfer belt that is arranged to move tangentially with respect to the supply roller by means of a transfer roller and an auxiliary roller. The LCD substrate is then moved tangentially with respect to the moving transfer belt such that the ink volumes on the transfer belt are transferred onto the substrate at selected locations thereon. The continuously rotating components of the apparatus enable it to accommodate LCD panels of any size without the need for large spacer supply substrates and transfer rollers and prevent the inadvertent deposition of multiple layers of spacers on the substrate.

14 Claims, 7 Drawing Sheets

FOREIGN PATENT DOCUMENTS

| | | |
|---|---|---|
| KR | 10-2004-0053431 | 6/2004 |
| KR | 10-2004-0059100 | 7/2004 |
| KR | 10-2004-0059643 | 7/2004 |

OTHER PUBLICATIONS

Patent Abstracts of Japan, Publication No. 09-029948, Feb. 4, 1997, 2 pp.

Patent Abstracts of Japan, Publication No. 09-141835, Jun. 3, 1997, 1 p.

Patent Abstracts of Japan, Publication No. 10-296957, Nov. 10, 1998, 1 p.

Patent Abstracts of Japan, Publication No. 2001-249342, Sep. 14, 2001, 1 p.

Patent Abstracts of Japan, Publication No. 2005-059415, Mar. 10, 2005, 1 p.

Korean Patent Abstract, Publication No. 1999-010129, Feb. 5, 1999, 1 p.

Korean Patent Abstracts, Publication No. 1020020088459, Nov. 29, 2002, 1 p.

Korean Patent Abstracts, Publication No. 1020040053431, Jun. 24, 2004, 1 p.

Korean Patent Abstracts, Publication No. 1020040059100, Jul. 5, 2004, 1 p.

Korean Patent Abstracts, Publication No. 1020040059643, Jul. 6, 2004, 1 p.

PRINTING BEAD SPACERS ON LCD SUBSTRATES

RELATED APPLICATIONS

This application claims priority of Korean Patent Application No. 10-2005-0062264, filed Jul. 11, 2005, the entire disclosure of which is incorporated herein by reference.

BACKGROUND

The present invention relates, in general, to apparatus for manufacturing liquid crystal displays ("LCDs"), and in particular, to an apparatus for printing bead spacers at predetermined locations on LCD substrates.

An LCD is currently one of the more widely used types of flat panel displays. An LCD includes a liquid crystal layer interposed between two transparent sheets, or substrates, having a plurality of field generating electrodes formed thereon. The LCD controls the transmission of light passing through the liquid crystal layer by rearranging the orientation of the molecules of the liquid crystal layer through the selective application of voltages to the electrodes.

Upper and lower substrates of the LCD are coupled to each other by a sealant at their periphery that seals the liquid crystal material therebetween. The upper and lower substrates are spaced apart from each other by spacers that maintain a selected "cell gap" between the substrates. The spacers can be either generally spherical "bead spacers" that are randomly scattered in an irregular pattern between the two substrates, or "columnar spacers" that are disposed in a uniform pattern therebetween.

The columnar spacers are formed by coating a photosensitive film on a color filter array panel of the display and then performing an expose-and-develop process on the film so that a desired opaque pattern is formed on the panel corresponding to, e.g., a channel unit, gate lines, storage electrode lines, and a light blocking member. Since an additional photolithography process is required during the formation of the columnar spacers, the production cost of the display unit is relatively greater than those incorporating bead spacers. Also, unlike the plastic-based bead spacers, the columnar spacers have a relatively low elasticity, and hence, can result in a relatively small LC fill margin. Accordingly, use of columnar spacers can lead to certain problems, such as LC filling failures, and "smear" failures, in which the spacers or a film on the lower surface of the upper panel is broken.

In the case of the randomly distributed bead spacers, however, the spacers can act as foreign particles that cause leakage of light from the panel and a deterioration of its contrast ratio. It is also possible for the bead spacers to move slightly and thereby cause damage to an alignment layer of the display.

To address the foregoing problems, apparatus was developed for "printing" bead spacers at predetermined locations on an LCD substrate. However, as the size of the substrate increases, the size of a spacer supply substrate and a transfer roller of the apparatus must be increased. Furthermore, when the spacer supply substrate transfers spacers to the transfer roller, spacers that are not transferred to the roller can remain in the recesses of the spacer supply substrate. Accordingly, when spacers are next transferred from the transfer roller to an LCD substrate, a manufacturing problem can arise because the spacers can be deposited in two or more layers.

BRIEF SUMMARY

In accordance with the exemplary embodiments thereof described herein, the present invention provides an apparatus for printing bead spacers at predetermined locations on an LCD panel substrate that overcomes the above and other problems of the prior art spacer printing apparatus.

In one exemplary embodiment thereof, the apparatus comprises a spacer supply roller having a plurality of recesses in an exterior surface thereof, and means for loading a uniform volume of an ink containing a plurality of spacers into each of the recesses. A transfer roller is disposed adjacent to and parallel with the spacer supply roller, and is coupled to the supply roller, e.g., by gears, for conjoint, opposite rotation therewith, and an auxiliary roller is disposed apart from and parallel to the transfer roller An endless loop transfer belt is supported on the transfer and auxiliary rollers for circulatory movement thereon, and has an exterior surface arranged to move tangentially against and at the same velocity as the exterior surface of the rotating spacer supply roller such that the respective volumes of ink in the recesses of the supply roller are transferred from the supply roller onto the exterior surface of the transfer belt.

A substrate support plate having an LCD substrate, or array panel, mounted thereon is arranged to move the substrate tangentially against and at the same velocity as the exterior surface of the moving transfer belt such that the respective volumes of ink on the transfer belt are transferred from the belt onto the substrate at precise, selected locations thereon.

The apparatus further includes a spacer supply device that dispenses measured quantities of the spacer-containing ink mixture onto the spacer supply roller.

The apparatus further includes a first cleaning unit disposed adjacent to the spacer supply roller and connected to the spacer supply device. The first cleaning unit includes an air sprayer that sprays air into the spacer supply roller, and functions to remove any spacer ink on the supply roller that is not transferred to the transfer belt.

The apparatus further includes a second cleaning unit disposed adjacent to the auxiliary roller, for removing spacer ink on the transfer belt that is not transferred to the LCD substrate. The second cleaning unit also includes an air sprayer that sprays air into the transfer belt.

The spacers preferably comprise bead spacers, and the spacer ink volumes are transferred to the surface of the transfer belt with the lateral and longitudinal pitches respectively corresponding to the axial and circumferential pitches of the recesses in the supply roller. The spacers are loaded into the recesses of the spacer supply roller together with a heat-curing agent or an ultraviolet-curing agent. The apparatus further includes a wiper blade that is brought into contact with the surface of the spacer supply roller, for forcing the ink mixture into the recesses.

The exemplary embodiments of the bead printing apparatus of the present invention prevent bead spacers from being inadvertently printed onto LCD substrates in layered stacks, enable the spacer supply substrate and transfer roller of the apparatus to remain relatively small with increasing LCD substrate size, and enable any spacers not printed onto a substrate to be economically reused.

A better understanding of the above and many other features and advantages of the improved bead spacer printing apparatus of the present invention may be obtained from a consideration of the detailed description of the exemplary embodiments thereof below, particularly if such consideration is made in conjunction with the several views of the appended drawings, wherein like reference numerals are used to identify like elements illustrated in one or more of the figures thereof.

DETAILED DESCRIPTION

Figure 1:
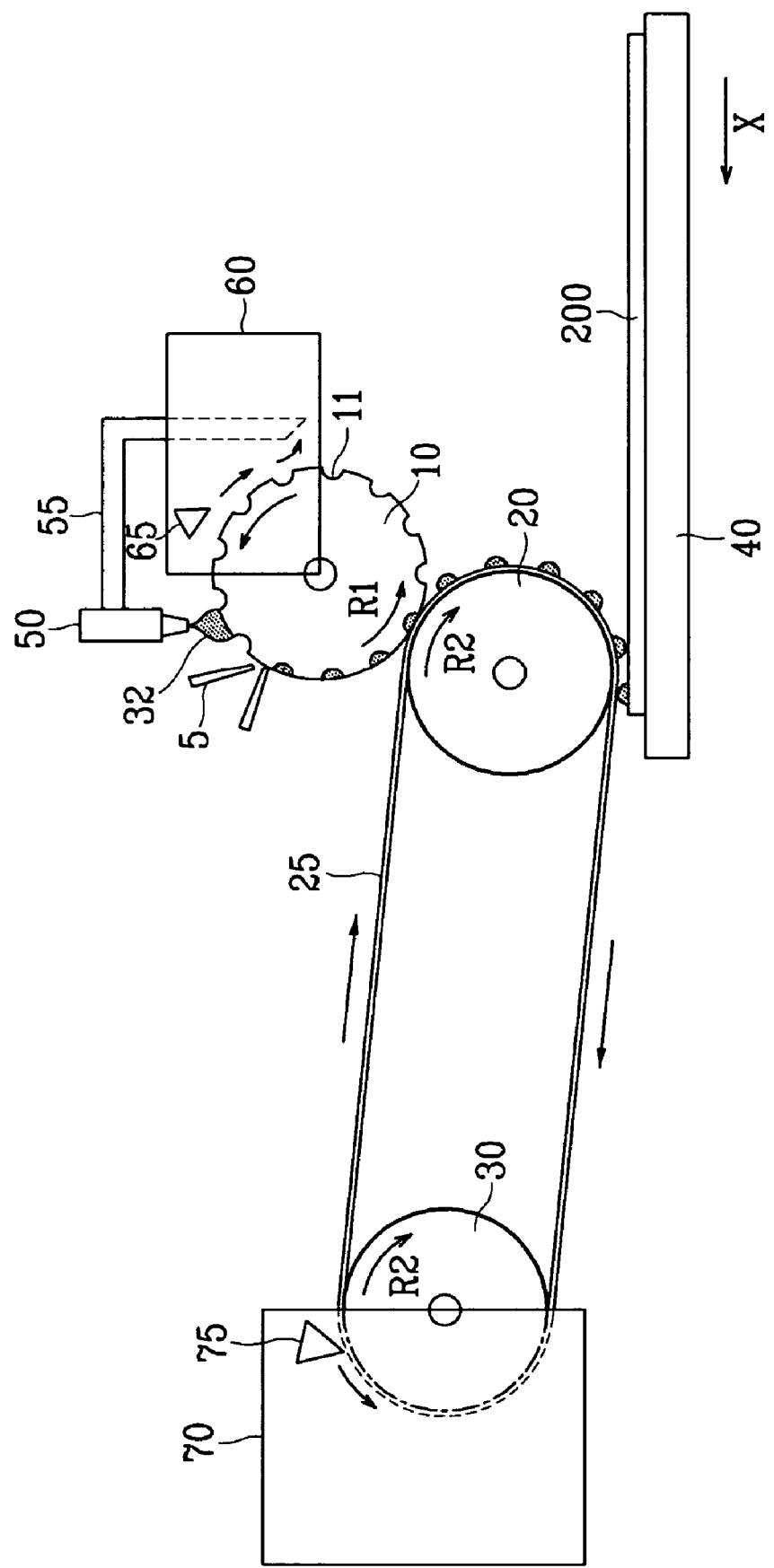
FIG. 1 is a schematic side elevation view of an exemplary embodiment of an LCD substrate spacer bead printing apparatus in accordance with the present invention.

FIG. 1 is a schematic side elevation view of an exemplary embodiment of an LCD substrate spacer bead printing apparatus in accordance with the present invention. As shown in FIG. 1, the exemplary apparatus includes a cylindrical spacer supply roller 10, a transfer roller 20 that is geared to rotate conjointly with and in an opposite direction to the spacer supply roller 10, an auxiliary roller 30 connected to the transfer roller 20 through a transfer belt 25, and a support plate 40 supporting an LCD panel 200, upon which a plurality of bead spacers 320 is to be printed at selected locations thereon.

Figure 3A:
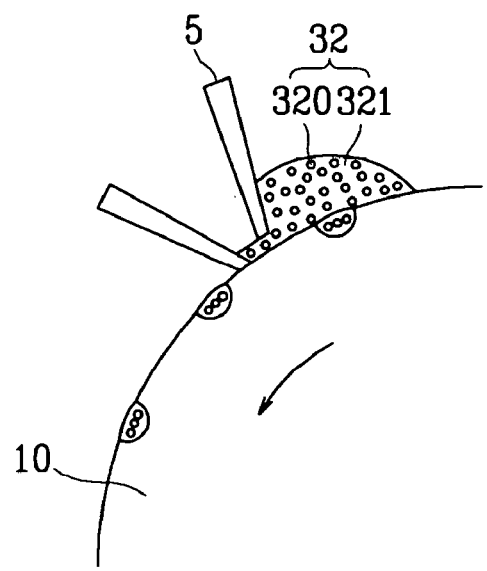
FIG. 3A is an enlarged partial detail view of the spacer supply roller of FIG. 2, illustrating the spacer ink deposited thereon being uniformly screeded into a plurality of recesses therein using a wiper blade.
Figure 3B:
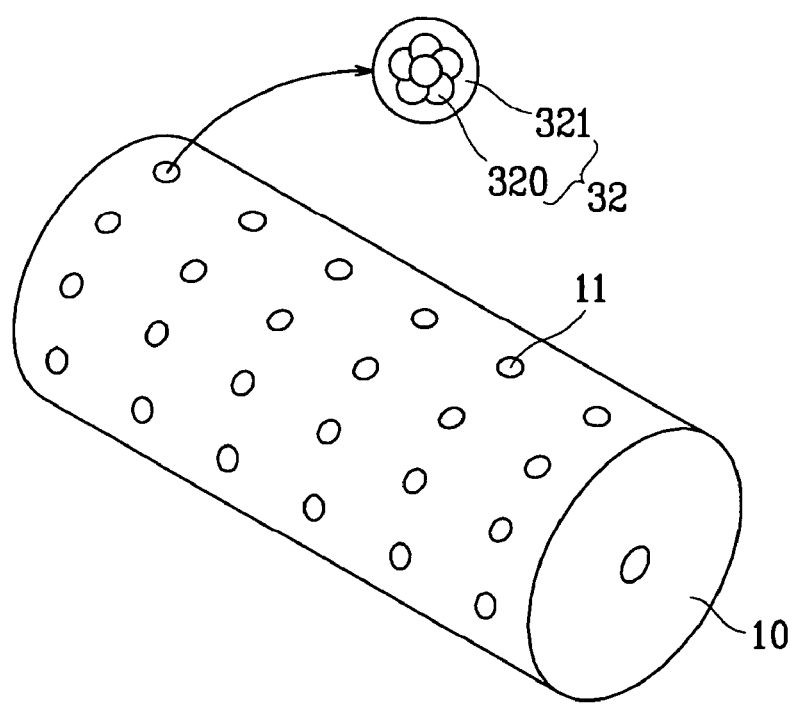
FIG. 3B is an upper side perspective view of the spacer supply roller illustrating the recesses into which the spacer ink has been screeded.

The spacer supply roller 10 includes a plurality of indentations, or recesses 11, formed in its surface at predetermined axial and circumferential intervals, or pitches, as illustrated in FIG. 3B. A spacer ink 32 mixture, including a plurality of bead spacers 320 and a hardening agent 321, is loaded into each of the recesses in a screeding or wiping process, as shown in FIG. 3A. The spacer supply roller 10 may be formed of a variety of materials, including glass, plastic, or a metal (e.g., stainless steel). The recesses 11 have depressed interior surfaces and can be formed by, e.g., photolithography, molding, or laser machining methods. The recesses 11 are formed at respective axial and circumferential pitches that are respectively the same as those desired of the pattern of spacers 320 that is to be formed on the display panel 200. The number of the bead spacers 320 that are loaded into the respective recesses 11 can be varied, depending on the desired cell gap, or spacing between the panels, of the display panel 200.

The transfer roller 20 is located between the spacer supply roller 10 and the display panel 200. The transfer belt 25 is interposed between the spacer supply roller 10 and the transfer roller 20. The transfer belt 25 is supported for circulatory movement on the respective outer surfaces of the transfer roller 20 and the auxiliary roller 30, and has an exterior surface arranged to move tangentially against, and at the same velocity as, the exterior surface of the rotating spacer supply roller. The transfer belt may be made, e.g., of a reinforced silicon material having a good hydrophilic property. As shown in FIG. 1, the auxiliary roller 30 rotates in the same direction (R2) as the transfer roller 20, the two rollers causing the transfer belt 25 to translate in the direction indicated by the arrows in FIG. 1, whereas, the direction of rotation (R2) of the transfer roller 20 is opposite to the direction of rotation (R1) of the spacer supply roller 10.

Figure 4:
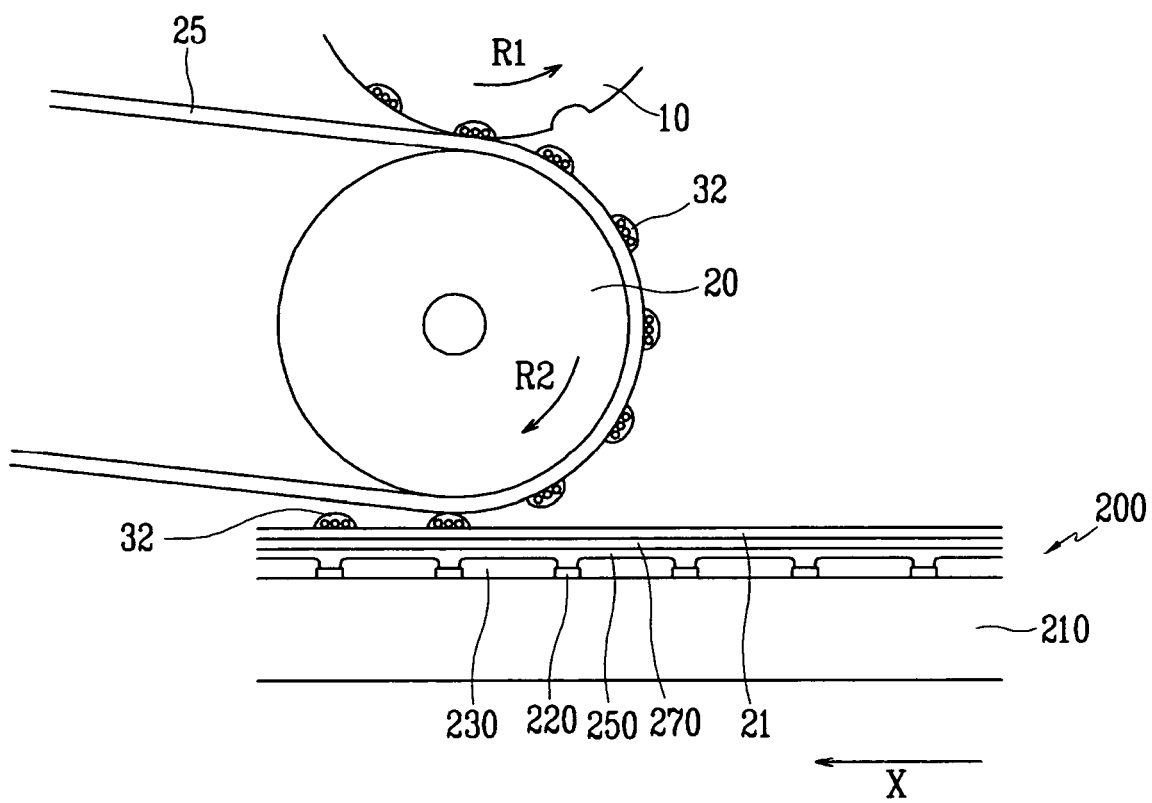
FIG. 4 is a partial side elevation view of a transfer belt of the apparatus, showing the spacer ink being transferred, first from the spacer supply roller to a surface of the transfer belt, and then from the transfer belt onto a surface of an array panel of an LCD display.

As a result of the tangential movement of the transfer belt 25 against the spacer supply roller 10, the respective volumes of spacer ink 32 that are loaded in the recesses 11 of the supply roller 10 are transferred onto the transfer belt as the supply roller and the transfer belt rotate past each other. Additionally, as illustrated in FIGS. 1 and 4, the panel support plate 40 is arranged to move tangentially relative to, and with the same velocity as, the transfer belt, i.e., in the direction X shown in FIG. 1, such that, as the transfer roller and belt continue to rotate, the volumes of spacer ink previously deposited onto the surface of the transfer belt by the supply roller are subsequently transferred onto the upper surface of the display panel 200 at the desired axial and circumferential pitches, or spacings, as described above.

Figure 2:
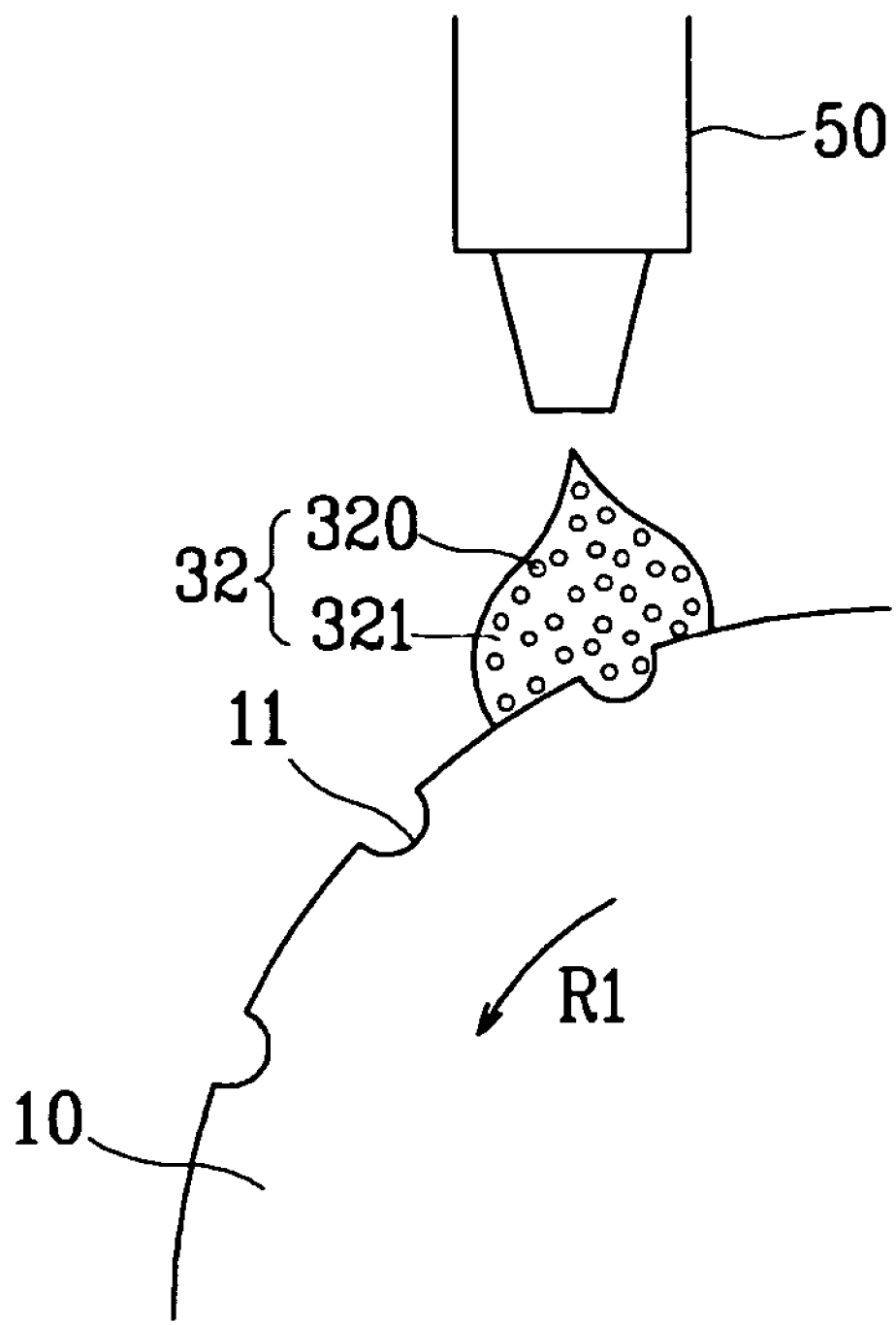
FIG. 2 is an enlarged partial detail view of a spacer supply roller of the exemplary bead printing apparatus of FIG. 1, illustrating the deposition of a spacer-containing ink onto the roller.

As illustrated in FIGS. 1 and 2, a spacer ink supply device 50 for supplying the spacer ink 32 to the spacer supply roller 10 is disposed adjacent to the spacer supply roller 10. The spacer supply device 50 functions to dispense the spacer ink 32 onto the spacer supply roller 10 in measured quantities. As described above, the spacer ink 32 is dispensed in a mixture that includes the plurality of bead spacers 320 and the curing or hardening agent 321 for hardening and fixing the bead spacers 320 on the display panel 200 with the application heat or UV energy.

The bead spacers 320 preferably comprise acrylic-based organic compounds that are capable of forming a polymer, and organic matter with a low dielectric constant, such as Teflon, benzocyclobutene (BCB), cytop, and perfluorocyclobutene (PFCB).

As illustrated in FIGS. 1 and 3A, a wiper blade 5 is disposed adjacent to the spacer supply device 50 spacer supply roller 10. The blade 5 contacts the surface of the spacer supply roller 10 and forces the spacer ink 32, which has been deposited on the surface of the spacer supply roller 10 by the supply device 50, into the recesses 11 in the surface of the spacer supply roller 10. The blade 5 thus functions like a screed or squeegee to force the spacer ink 32 into the recesses 11 while simultaneously accumulating any surplus spacer ink 32 that has not been forced into the recesses 11 of the roller.

As illustrated in FIG. 1, a first cleaning unit 60 is disposed adjacent to the spacer supply roller 10. The first cleaning unit 60 includes an air sprayer 65 for spraying air onto the side of the spacer supply roller 10 opposite to the supply device 50 and wiper blade 5. The first cleaning unit 60 further comprises an intake port 55 connected to the spacer supply device 50. The air sprayer 65 functions to remove any surplus spacer ink 32 that has not been forced into the recesses 11 of the spacer supply roller 10, as well as any ink that has not been transferred from the supply roller onto the transfer belt 25. Since the cleaning unit thus removes any spacer ink 32 remaining in the recesses 11 of the spacer supply roller 10, it prevents the spacer ink 32 from being deposited in double layers on the display panels 200. Additionally, since the intake port 55 draws in the spacer ink 32 that has been removed from the surface of the spacer supply roller 10 by the air sprayer 65 and returns it to the spacer supply device, the unused spacer ink is thereby recovered for reuse by the spacer supply device 50.

As shown in FIG. 1, a second cleaning unit 70 is disposed on the auxiliary roller 30. The second cleaning unit 70 also includes an air sprayer 75 for spraying air onto the transfer belt 25. The air sprayed by the second cleaning unit 70 onto the transfer belt 25 removes any spacer ink 32 on the transfer belt 25 that was not transferred from the belt onto the display panel 200.

Figure 5:
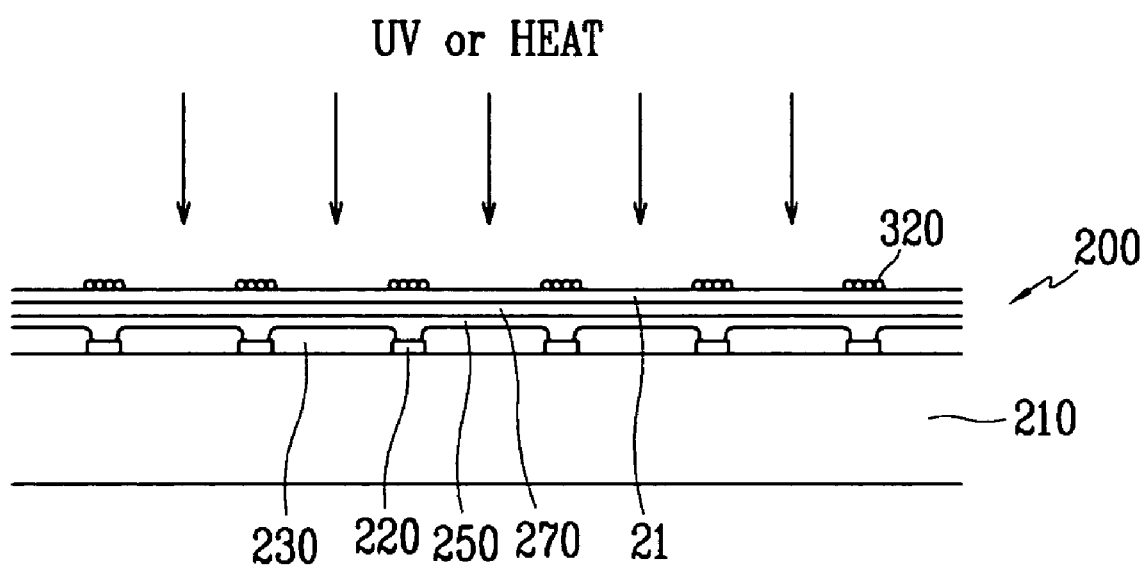
FIG. 5 is a partial side elevation view illustrating the spacer ink that was transferred onto the LCD array panel of FIG. 4 being cured to form spacers.

A method of manufacturing an LCD using the exemplary spacer printing apparatus of the present invention is now described with reference to the figures. FIG. 2 is an enlarged detail view illustrating the deposition of spacer ink onto spacer supply roller. FIG. 3A is a detail view illustrating the use of a wiper blade to screed the spacer ink deposited on the spacer supply roller into a plurality of uniform volumes of ink respectively disposed in recesses in the surface of the supply roller. FIG. 3B is a perspective view of the spacer supply roller showing the recesses into which the respective volumes of the spacer ink has been loaded. FIG. 4 is a detail view illustrating the uniform volumes of spacer ink being transferred, first from the spacer supply roller onto the surface of a transfer belt, and then from the transfer belt surface onto a display panel. FIG. 5 illustrates the volumes of spacer ink transferred onto an array panel 200 being cured, e.g., by the application of heat or ultraviolet (UV) radiation, to form hardened spacers of a uniform height.

As shown in FIG. 2, the spacer supply device 50 dispenses a measured quantity of the spacer ink 32 onto the spacer supply roller 10 while the roller rotates in a counterclockwise direction (R1). As discussed above, the fluid spacer ink 32 mixture includes a plurality of bead spacers 320 and a heat- or a UV-curing agent 321.

As shown in FIG. 3A, the spacer ink 32 is forced into the recesses 11 in the surface of the spacer supply roller 10 by the wiper blade 5. As shown in FIGS. 3A and 3B, the bead spacers 320 clump together to form a globule at the edge of the blade, and are then forced by the blade into the recesses 11, along with the hardening agent 321. The size of the individual spacers 320 are preferably smaller than the diameter of the recesses 11 such that, for example, 6 to 7 spacers 320 are loaded into each recess.

As shown in FIG. 4, as the spacer supply roller 10, which is rotatably coupled to the transfer roller 20 for conjoint rotation in opposite directions, rotates in the counterclockwise direction (R1), the uniform volumes of spacer ink 32 respectively loaded in the recesses 11 of the spacer supply roller 10 are brought into contact with and transferred onto the surface of the tangentially moving transfer belt 25, to which they temporarily adhere at a down-web pitch corresponding to the circumferential pitch of the recesses in the supply roller, and at a cross-web pitch corresponding to the axial pitch of the recesses therein. As described above, any spacer ink 32 that does not transfer onto the transfer belt 25, but which remains on the surface or in the recesses of the spacer supply roller 10, is removed by the first cleaning unit 60 and is recovered by the spacer supply device 50 through the intake port 55 for reuse on subsequent panels.

As the transfer roller 20 continues to rotate in a clockwise direction (R1), the spacer ink 32 that has temporarily adhered on the surface of the transfer belt 25 is then brought into contact with and transferred onto the display panel 200, which is moved tangentially against, and with the same velocity as, the moving transfer belt by the panel support plate 40, as illustrated in FIGS. 1 and 4. Accordingly, the volumes of spacer ink 32 are deposited onto the display panel 200 at precise, selected locations respectively corresponding to axial and circumferential pitches of the recesses in the supply roller. Any spacer ink 32 that is not transferred onto the display panel 200, but instead remains on the transfer belt 25, is removed by the second cleaning unit 70, as described above.

FIG. 4 illustrates the spacer ink 32 being transferred onto a display panel 200 upon which a light blocking member 220, a color filter 230, an overcoat film 250, a common electrode 270, and an alignment layer 21 have already been formed. However, it should be understood that, if desired, the spacer ink 32 can be formed on the panel before the alignment layer 21 is formed. In such an embodiment, the spacers 320 can be very accurately deposited in regions corresponding to the light blocking members 220 to prevent the occurrence of light leakage from the display.

As shown in FIG. 5, the spacers 320 that were transferred, along with the curing agent 321, are cured by the application of, e.g., heat or UV, and thereby firmly adhered to the display panel 200 in the selected locations.

Figure 7:
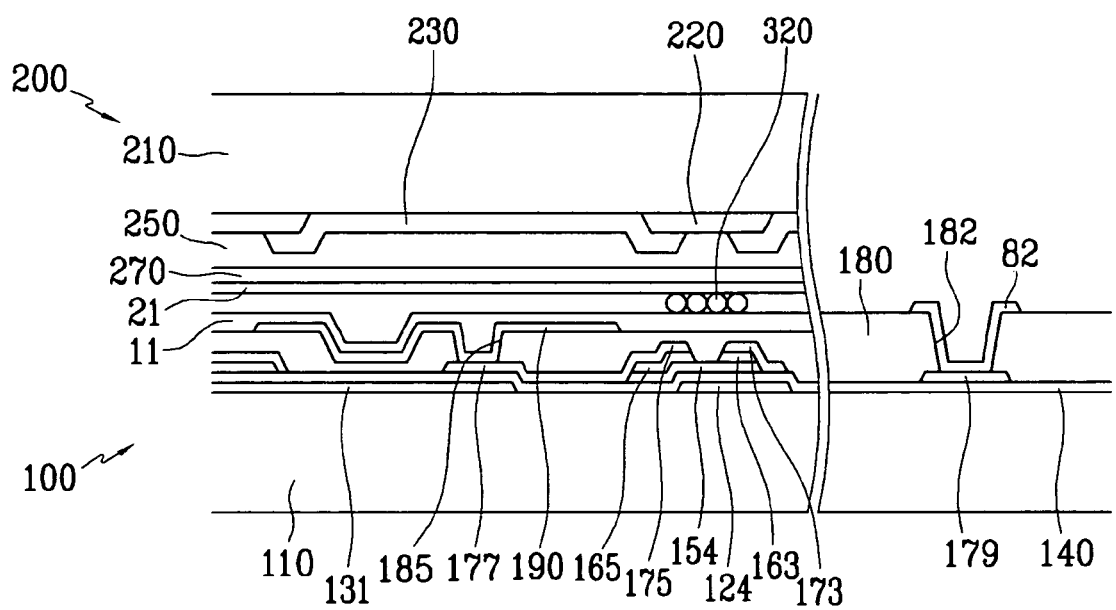

As illustrated in FIG. 7, in the next LCD assembly process, the upper panel 200, on which the cured spacers 320 are disposed, is pressed down onto the lower panel 100 and attached thereto.

As those of skill in the art will appreciate, by incorporating the continuously rotating spacer supply roller 10, transfer roller 20, and auxiliary roller 30 described above, the apparatus of the present invention can accommodate display substrates of any practical size, and hence, the need for relatively large spacer supply substrates and transfer rollers required by the prior art printing apparatus to accommodate large displays is eliminated.

Figure 6:
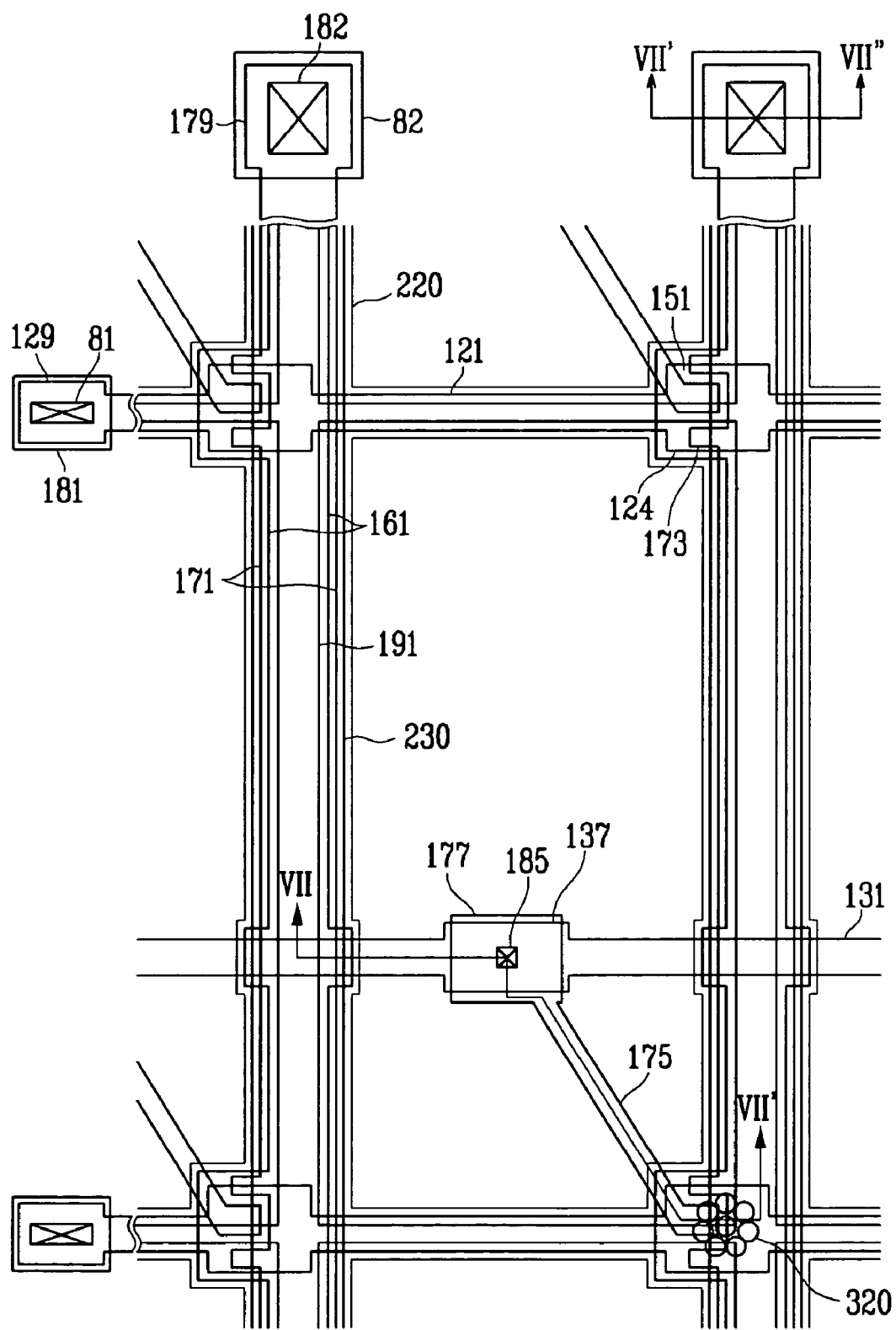
FIG. 6 is a partial top plan view of a thin film transistor LCD array panel upon which a plurality of spacers has been formed using the exemplary apparatus of the present invention; and, FIG. 7 is a partial cross-sectional view of an LCD incorporating the LCD array panel of FIG. 6, as seen along the section lines VII-VII'-VII" taken in FIG. 6.

FIG. 6 is a partial top plan view of an LCD thin film transistor (TFT) array panel in which the spacers are formed by the exemplary spacer bead printing apparatus of the present invention. FIG. 7 is a cross-sectional view of an LCD including the TFT array panel as seen along the section lines VII-VII'-VII" taken in FIG. 6.

As shown in FIG. 6, the array panel includes a plurality of gate lines 121 and a plurality of storage electrode lines 131 that are formed on a transparent, electrically insulating substrate 110 made of, e.g., glass, plastic or the like. The gate lines 121 function to transfer gate signals and generally extend in a transverse direction. Each of the gate lines 121 includes a plurality of gate electrodes 124 protruding downwardly and an end portion 129 having a wide area for connection with other layers or an external driving circuit. A gate driving circuit (not shown) that generates the gate signal may be mounted on a flexible printed circuit film (not shown) adhered on the substrate 110, may be directly mounted on the substrate 110, or may be integrated with the substrate 110. Where the gate driving circuit is integrated with the substrate 110, the gate lines 121 may be directly connected to the gate driving circuit.

The storage electrode lines 131 have a predetermined voltage applied to them and extend almost parallel to the gate lines 121. Each of the storage electrode lines 131 is located between two adjacent gate lines 121, and is disposed closer to a lower one of the two gate lines 121 than to an upper one thereof. Each of the storage electrode lines 131 includes a storage electrode 137 that extends upwardly and downwardly. However, the shape, size, arrangement, and the like, of the storage electrode lines 131 can vary widely from those shown.

The gate lines 121 and the storage electrode lines 131 may be formed of an aluminum-based metal, such as aluminum (Al) or an aluminum alloy, a silver-based metal, such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), or the like. Alternatively, they may have a multi-film structure including two conductive layers (not illustrated) that have different physical properties. One of the conductive layers may be formed using a metal with low resistivity, such as an aluminum-based metal or a copper-based metal, in order to reduce signal delay or voltage drop. Unlike the above, other conductive layers may be formed using materials having good physical, chemical, and electrical contact characteristics with ITO (indium tin oxide) and IZO (indium zinc oxide), such as a molybdenum-based metal, chromium, tantalum, titanium, or the like. Preferred examples of the combination may include a lower chromium film and an upper aluminum (alloy) film, and a lower aluminum (alloy) film and an upper molybdenum (alloy) film. It should be understood, however, that the gate lines 121 and the storage electrode lines 131 may be formed of a wide variety of metals or conductors other than the above-mentioned materials.

The sides of the gate lines 121 and the storage electrode lines 131 are tilted from the surface of the substrate 110. The tilt angle may be in the range of about 30° to about 80°. A gate insulating layer 140 made of silicon nitride (SiNx) or silicon oxide (SiOx) is formed on the gate lines 121 and the storage electrode lines 131.

A plurality of linear semiconductors 151 made of hydrogenated amorphous silicon ("a-Si"), polysilicon or the like are formed on the gate insulating layer 140. The linear semiconductors 151 generally extend in a longitudinal direction and include a plurality of projections 154 extending toward the gate electrodes 124. The semiconductor 151 have widened portions formed near the gate lines 121 and the storage electrode lines 131 that are arranged to cover the gate lines 121 and the storage electrode lines 131.

A plurality of linear and island type ohmic contacts 161 and 165 are formed on the semiconductors 151. The ohmic contacts 161 and 165 may be formed using a material such as n+ hydrogenated amorphous silicon into which an n-type impurity is doped at a high concentration, or silicide. The linear ohmic contact 161 has a plurality of projections 163. Each projection 163 and an island type ohmic contact 165 form an associated pair and are respectively disposed on associated ones of the projections 154 of the semiconductors 151.

The sides of the island type semiconductors 151 and the ohmic contacts 161 and 165 are also tilted from the surface of the substrate 110. The tilt angle may be within a range of about 30° to 80°.

A plurality of data lines 171 and a plurality of drain electrodes 175 are formed on the ohmic contacts 161 and 165 and the gate insulating layer 140. The data lines 171 function to transfer data signals. The data lines 171 extend in a generally longitudinal direction and cross the gate lines 121 and the storage electrode lines 131. Each of the data lines 171 includes a plurality of source electrodes 173 extending toward the gate electrodes 124, and an end portion 179 having a wide area for connection with other layers or an external driving circuit. A data driving circuit (not illustrated) that generates the data signal may be mounted on a flexible printed circuit film (not illustrated) adhered on the substrate 110, may be directly mounted on the substrate 110, or may be directly integrated with the substrate 110. Where the data driving circuit is integrated on the substrate 110, the data lines 171 may be directly connected to the data driving circuit.

Drain electrodes 175 are separated from the data lines 171 and are disposed opposite to the source electrodes 173 across the gate electrodes 124. Each of the drain electrodes 175 includes one wide end portion and one pole-shaped end portion. The wide end portion is overlaps the storage electrode 137, and the pole-shaped end portion is partially surrounded by the bent source electrode 173.

One gate electrode 124, one source electrode 173, and one drain electrode 175 form one thin film transistor (TFT), along with the projection 154 of the semiconductor 151. A channel of the thin film transistor is formed at the projection 154 between the source electrode 173 and the drain electrode 175.

The data lines 171 and the drain electrodes 175 may be formed of a refractory metal, such as molybdenum, chromium, tantalum, or titanium, or an alloy thereof, and may have a multi-film structure that includes a refractory metal film (not shown) and a low resistance conductive layer (not shown). Examples of these multi-film structures may include a dual film of a lower chromium or molybdenum film and an upper aluminum (alloy) film, a triple film of a lower molybdenum (alloy) film, an intermediate aluminum (alloy) film, and an upper molybdenum (alloy) film, and so on. It should be understood, however, that the data lines 171 and the drain electrodes 175 can be formed of a wide variety of other metals or conductors than those outlined above.

The sides of the data lines 171 and the drain electrodes 175 may also have a tilt angle of about 30° to 80° from the surface of the substrate 110. The ohmic contacts 161 and 165 exist only between the semiconductors 151 below the ohmic contacts 161 and 165, and the data lines 171 and the drain electrodes 175 on the ohmic contacts 161 and 165, and function to reduce contact resistance therebetween. In most locations, the linear semiconductor 151 is narrower than the data line 171. However, the semiconductor 151 has a greater width where it meets the gate line 121, as described above, thereby smoothing the profile of the surface. It is therefore possible to prevent the data lines 171 from being shorted. The semiconductor 151 includes portions that are not fully covered with the data lines 171 and the drain electrodes 175, and is thus exposed, for example, between the source electrodes 173 and the drain electrodes 175.

A passivation layer 180 is formed on the data lines 171, the drain electrodes 175 and the exposed semiconductors 151. The passivation layer 180 may be formed using an inorganic insulator, an organic insulator, or the like, and may have a flat, planar surface. Examples of the inorganic insulator may include silicon nitride and silicon oxide. The organic insulator may have photosensitivity and a dielectric constant of about 4.0 or less. Alternatively, the passivation layer 180 may have a dual film structure of a lower inorganic film and an upper organic film so that the layer protects the exposed semiconductor 151 portions while maintaining the excellent insulating characteristic of the organic film.

A plurality of contact holes 182 and 185 through which the end portions 179 of the data lines 171 and the drain electrodes 175 are exposed, respectively, are formed in the passivation layer 180. A plurality of contact holes 181 through which the end portions 129 of the gate lines 121 are exposed are formed in the passivation layer 180 and the gate insulating layer 140.

A plurality of pixel electrodes 191, and a plurality of contact assistants 81 and 82 are formed on the passivation layer 180. The plurality of pixel electrodes 191 and the plurality of contact assistants 81 and 82 may be formed using a transparent conductive material such as ITO or IZO, or a reflective metal such as aluminum, silver, chromium, or an alloy thereof.

The pixel electrodes 191 are physically and electrically connected to the drain electrodes 175 through the contact holes 185 have a data voltage applied to them from the drain electrodes 175. The pixel electrodes 191 to which the data voltage has been applied generate an electric field along with the common electrode 270 of the other display panel (not shown) to which a common voltage is applied, thereby determining the direction of the molecules of a liquid crystal layer (not shown) between the two electrodes 191 and 270. The polarization of light that passes through the liquid crystal layer is altered according to the direction of liquid crystal molecules, which is determined as described above. The pixel electrodes 191 and the common electrode 270 constitute a capacitor (i.e., a "liquid crystal capacitor"). The capacitor maintains a voltage applied thereto even after the associated TFT has been turned off.

The pixel electrodes 191 and the drain electrodes 175 connected thereto overlap the storage electrode lines 131. A capacitor in which the pixel electrodes 190 and the drain electrodes 175 that are electrically connected to the pixel electrodes 190 overlapping the storage electrode lines 131 is referred to a "storage capacitor". The storage capacitors operate to enhance the voltage sustaining capability of the liquid crystal capacitors.

The contact assistants 81 and 82 are connected to the end portions 129 of the gate lines 121 and the end portions 179 of the data lines 171 through the contact holes 181 and 182, respectively. The contact assistants 81 and 82 function to compensate the adhesiveness between the end portions 129 of the gate lines 121 and the end portions 179 of the data lines 171 and an external apparatus, and also to protect them. A lower alignment layer 9 that determines the alignment of liquid crystal is formed on the pixel electrodes 191.

With reference to FIG. 7, a common electrode panel of the display comprises an transparent, electrically insulating substrate 210 made of glass, plastic, or the like, which is disposed above and spaced apart from the lower alignment layer 9 by a predetermined distance. A light blocking member 220, such as a black matrix, is formed on the insulation substrate 210 in a matrix form. The light blocking member 220 functions to divide the pixel area. Color filters 230 for representing three primary colors that are necessary to display an image, such as red, green, and blue ("RGB") filters, are formed between the light blocking members 220 and partially overlap the light blocking members 220. The red, green and blue filters may be formed as stripes. Alternatively, the color filters can be separately formed for each pixel.

To protect the light blocking member 220 and the color filters 230, an overcoat film 250 is formed on the light blocking member 220 and the color filter 230. The protective overcoat film 250 may be formed using an organic insulating material. The overcoat film 250 functions to prevent exposure of the color filters 230 and provides a flat display surface. Optionally, the overcoat film 250 may be omitted, if appropriate.

The common electrode 270 is formed on the overcoat film 250, and is made of a transparent conductor, such as ITO or IZO, and functions in cooperation with the pixel electrodes 191 to form an electric field. The upper alignment layer 21 is formed on the common electrode 270.

As illustrated in FIGS. 6 and 7, the pluralities of bead spacers 320 are formed and disposed on the upper alignment layer 21 in positions corresponding to the light blocking member 220. The plurality of bead spacers 320 form a uniform cell gap and enhance the elastic force separating the two display substrates, thereby preventing the occurrence of "smear failure," which can otherwise result when pressure is applied to the display panel 200.

As described above, the exemplary LCD bead spacer printing apparatus of the present invention uses a continuously rotating spacer supply roller, transfer roller, auxiliary roller and re-circulating transfer belt to accommodate LCD panels of any size, and accordingly, eliminates the need for large spacer supply substrates and transfer rollers to accommodate large panels.

Additionally, the first cleaning unit disposed adjacent to the spacer supply roller removes any spacers remaining in the recesses of the spacer supply roller, thereby preventing spacers from being deposited on the display panel in double layers. Further, the intake port connected to the spacer supply device enables the spacers to be efficiently reused.

Moreover, the second cleaning unit disposed adjacent to the auxiliary roller removes any spacers remaining on the transfer belt, thereby also functioning to prevent spacers from being deposited on the panels in double layers.

As those of skill in this art will by now appreciate, many modifications, substitutions and variations can be made in the materials, apparatus, configurations and methods of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. An LCD spacer printing apparatus, comprising:
   a spacer supply roller having a plurality of recesses in an exterior surface thereof;
   means for loading a uniform volume of an ink containing a plurality of spacers into each of the supply roller recesses;
   a transfer roller disposed adjacent to and parallel with the spacer supply roller and coupled with the spacer supply roller for conjoint, opposite rotation therewith;
   an auxiliary roller disposed apart from and parallel to the transfer roller; and,
   an endless loop transfer belt having opposite ends respectively supported by the auxiliary roller and the transfer roller for circulatory movement thereon,
   wherein the transfer belt has an exterior surface arranged to move tangentially against and at the same velocity as the exterior surface of the rotating spacer supply roller such that the respective volumes of ink in the recesses of the supply roller are transferred from the supply roller onto the exterior surface of the transfer belt.

2. The apparatus of claim 1, further comprising a support plate having a substrate mounted thereon and arranged to move the substrate tangentially against and at the same velocity as the exterior surface of the moving transfer belt such that the respective volumes of ink on the transfer belt are transferred from the transfer belt onto the substrate at selected locations thereon.

3. The apparatus of claim 1, further comprising a spacer supply device for dispensing the ink onto the exterior surface of the spacer supply roller.

4. The apparatus of claim 3, further comprising a wiper blade disposed adjacent to the exterior surface of the spacer supply roller and arranged to force the ink on the exterior surface of the spacer supply roller into the recesses thereof.

5. The apparatus of claim 1, further comprising a first cleaning unit disposed adjacent to the spacer supply roller and connected to the spacer supply device.

6. The apparatus of claim 5, wherein the first cleaning unit includes an air sprayer that sprays air onto the spacer supply roller.

7. The apparatus of claim 1, further comprising a second cleaning unit disposed adjacent to the auxiliary roller, for removing spacers remaining on the transfer belt.

8. The apparatus of claim 6, wherein the second cleaning unit includes an air sprayer that sprays air onto the transfer belt.

9. The apparatus of claim 1, wherein the spacers are bead spacers.

10. The apparatus of claim 1, wherein the recesses of the spacer supply roller are spaced apart from each other at respective axial and circumferential pitches, and wherein the respective volumes of ink are transferred from the spacer supply roller onto the exterior surface of the transfer belt at the same respective pitches.

11. The apparatus of claim 1, wherein the ink comprises a mixture of the spacers and a heat-curing or an UV-curing agent.

12. A method for printing spacers at selected locations on a substrate of an LCD, the method comprising:

providing a rotating cylindrical spacer supply roller having a plurality of recesses in an exterior surface thereof;

loading each of the recesses with a volume of an ink mixture containing a plurality of spacers and a curing agent;

moving an exterior surface of a transfer belt tangentially against and at the same velocity as the exterior surface of the rotating spacer supply roller such that the respective volumes of ink in the recesses of the supply roller are transferred onto the exterior surface of the transfer belt; and, moving a surface of the LCD substrate tangentially against and at the same velocity as the exterior surface of the moving transfer belt such that the respective volumes of ink on the exterior surface of the transfer belt are transferred onto the surface of the LCD substrate at the selected locations thereon.

13. The method of claim 12, further comprising removing from the exterior surface of the spacer supply roller any of the ink that was not transferred from the roller to the transfer belt.

14. The method of claim 12, further comprising removing from the exterior surface of the transfer belt any of the ink that was not transferred from the belt to the LCD substrate.

* * * * *